United States Patent [19]

Bretz et al.

[11] 4,230,586
[45] Oct. 28, 1980

[54] AQUEOUS WELL-DRILLING FLUIDS

[75] Inventors: John Bretz, Parma; Leonard S. Cech, Wickliffe, both of Ohio

[73] Assignee: The Lubrizol Corporation, Wickliffe, Ohio

[21] Appl. No.: 931,799

[22] Filed: Aug. 7, 1978

[51] Int. Cl.$^3$ .................................................. C09K 7/02
[52] U.S. Cl. .............................. 252/8.5 P; 252/8.5 A; 252/8.5 C
[58] Field of Search ................ 252/8.5 P, 8.5 C, 49.5, 252/8.5 A

[56] References Cited

U.S. PATENT DOCUMENTS

| | | | |
|---|---|---|---|
| 3,047,494 | 7/1962 | Browning | 252/8.5 |
| 3,125,517 | 3/1964 | Voda | 252/8.5 |
| 3,214,374 | 10/1965 | Sample | 252/8.5 |
| 3,236,769 | 2/1966 | Burdyn et al. | 252/8.5 |
| 3,275,551 | 9/1966 | Annis | 252/8.5 |
| 3,328,295 | 6/1967 | Lummus et al. | 252/8.5 |
| 3,350,308 | 10/1967 | McMillan | 252/33 |
| 3,376,222 | 4/1968 | McMillan | 252/33 |
| 3,384,586 | 5/1968 | McMillan | 252/33 |
| 3,492,231 | 1/1970 | McMillan | 252/33 |
| 3,528,914 | 9/1970 | Darley | 252/8.5 |
| 4,064,055 | 12/1977 | Carney | 252/8.5 |
| 4,064,056 | 12/1977 | Walker et al. | 252/8.5 |

OTHER PUBLICATIONS

Schick, *Nonionic Surfactants*, published 1967 by Marcel Dekker, Inc., New York, pp. 187–190.
Rosenberg et al., AIME Petroleum Transactions, vol. 216, 1959, pp. 195–202.

*Primary Examiner*—Herbert B. Guynn
*Attorney, Agent, or Firm*—Daniel N. Hall; William H. Pittman

[57] ABSTRACT

Aqueous well-drilling fluids treated with additives comprising a non-Newtonian colloidal disperse system containing metal-containing particles, a dispersing medium and an organic compound having both a hydrophobic and a polar substituent in combination with at least one emulsifier are disclosed. Specific examples of the disperse system comprise calcium carbonate particles predispersed in a mineral oil dispersing medium in the presence of a calcium petrosulfonate; useful emulsifiers include alkylene oxide/fatty amine condensates. Well-drilling fluids containing such additives reduce the torque requirements in rotary drilling operations.

19 Claims, No Drawings

AQUEOUS WELL-DRILLING FLUIDS

FIELD OF THE INVENTION

This invention relates to aqueous well-drilling fluids. More particularly it relates to fluids containing additives comprising colloidal disperse systems and emulsifiers. Such additives provide lubricity to the drilling fluids and thus allow rotary drilling operations to be carried out at reduced torque. Methods of carrying out drilling operations using these drilling fluids are also within the scope of the invention.

PRIOR ART

The use of drilling fluids in well-drilling operations has been known for at least 100 years. See, for example, the discussion in Kirk-Othmer, "Encyclopedia of Chemical Technology", Second Edition, Vol. 7, pages 287 et seq. Aqueous drilling fluids or muds usually contain a thickening agent such as clay and often a density-increasing agent such as barites. The use of other additives in drilling fluids or muds is also known. See, for example, John McDermott, "Drilling Mud and Fluid Additives", Noyes-Data Corporation, New Jersey, 1973.

Among the types of additives used in drilling muds or fluids are lubricants or lubricity agents. Such additives reduce drag on the drill string and bit and thereby reduce the possibilities of twist off, reduce trip time, lessen differential sticking and lower the amount of energy required to turn the rig (that is, the torque requirements).

Methods for evaluating such drilling fluid lubricants are also known. See, for example, the article by Stan E. Alford in "World Oil", July, 1976, Gulf Publishing Company.

Other additives which enhance the lubricating properties of drilling fluids or muds have been reported in the patent literature. See, for example, U.S. Pat. Nos. 3,214,374 and 4,064,055. The use of petroleum sulfonates as extreme pressure additives in oil emulsion and aqueous drilling fluids is also known. See the article by M. Rosenberg et al. in AIME Petroleum Transactions, Vol. 216 (1959), pages 195–202 and U.S. Pat. No. 4,064,056.

In addition, U.S. Pat. No. 3,236,769 to Burdyn et al describes the use of certain defoamants and water-soluble, nonionic surfactants in drilling fluids. U.S. Pat. No. 3,328,265 to Lummus et al describes the use of certain anti-differential sticking agents which include alkyl aryl sulfonic acid amine salts of defined structure in drilling muds. U.S. Pat. No. 3,125,517 to Voda describes the use of combinations of certain carboxylic or aromatic sulfonic acids and certain ethoxylated acetamides, amines, diamines and sarcosinamides in water-in-oil emulsion drilling fluids.

Despite the afore-described prior art, the search for effective drilling fluids and muds, which aid in achieving more efficient and economical rotary drilling operations, has continued.

It is an object of the present invention to provide such aqueous fluids and muds which exhibit enhanced lubricating properties of a drilling fluid and thereby reduce the torque requirements for drilling operations.

It is also an object of this invention to provide a method of reducing torque requirements in rotary drilling operations using such drilling fluids.

BRIEF DESCRIPTION OF THE INVENTION

The aqueous well-drilling fluids of this invention comprise (A) at least one non-Newtonian colloidal disperse system comprising:
  (1) solid metal-containing colloidal particles at least a portion of which are predispersed in
  (2) at least one liquid dispersing medium; and
  (3) as an essential component, at least one organic compound which is soluble in said dispersing medium, the molecules of said organic compound being characterized by a hydrophobic portion and at least one polar substituent
and (B) at least one emulsifier.

These aqueous drilling fluids also comprise clay/water slurries. They are not water-in-oil emulsions which, in general, are more costly and less convenient than the aqueous drilling fluids of this invention. Methods for reducing torque requirements in rotary drilling operations comprising the step of using the afore-described inventive drilling fluids, are also included in the invention.

DETAILED DESCRIPTION OF THE INVENTION

The non-Newtonian colloidal disperse systems used in the additives of this invention are well known to the art and are described, for example, in U.S. Pat. Nos. 3,492,231, 3,242,079, 3,027,325, 3,488,284, 3,372,114, 3,411,923, 3,372,115, 3,422,013, 3,350,308, 3,312,618, 3,376,222, 3,471,403, 3,453,124, 3,377,283, 3,595,790, 3,766,067, 3,766,066, 3,671,012 and 3,384,586. These patents are incorporated by reference for their disclosures relating to the nature and methods of preparing non-Newtonian colloidal disperse systems useful in the drilling fluids of the present invention.

These disperse systems, on a macroscopic scale, are gel-like in appearance and behavior. In them at least a portion of the particles dispersed therein are solid metal-containing particles formed in situ. In other words, at least a portion of the particles are predispersed in the oil medium. The size of these particles is not critical as long as they are dispersed in the form, for example, of colloids or colloidal solutions. Ordinarily, the particles do not exceed 5000 A (angstroms) in size. Generally, the maximum unit particle size is less than about 1000 A, usually less than 400 A. Disperse systems having unit particle sizes in the range of about 20 A to about 1000 A have been found to give excellent results. The term "unit particle size" is defined in the above-noted U.S. Pat. No. 3,384,586 patent which is incorporated herein by reference for this definition.

The solid metal-containing particles are metal salts of inorganic acids and low molecular weight organic acids (such as formic, acetic and propionic acids), hydrates thereof, or mixtures of two or more of these. These salts are usually alkali and alkaline earth formates, acetates, carbonates, hydrogen carbonates, hydrogen sulfides, sulfides, sulfates, hydrogen sulfates and halides. Magnesium, calcium and barium salts are typical examples. Mixtures of two or more of any of these can also be present. Typically the metal particles are solid metal-containing colloidal particles consisting essentially of alkaline earth metal salts, these salts being further characterized by having been formed in situ and predispersed.

Colloidal disperse systems used in the fluids of this invention also comprise at least one liquid dispersing medium. The identity of the medium is not a critical aspect of the invention as the medium serves primarily as a liquid vehicle in which the solid particles are dispersed. Normally it consists of one or more substantially inert, non-polar organic liquids. That is, liquids which are substantially chemically inactive in the particular environment in question. The liquid dispersing medium may be substantially volatile or non-volatile at standard temperatures and pressures. Often the non-Newtonian disperse system is prepared in such a manner that a mixture of such volatile and non-volatile organic liquids is used as the dispersing medium thus permitting easy removal of all or a portion of the volatile component by heating. This is an optional and often desirable means for controlling the viscosity or fluidity of the disperse system.

Typical dispersing media include materials such as mineral oils and synthetic oils. Other organic liquids such as ethers, alkanols, alkylene glycols, ketones, and the like are useful as dispersing mediums. In addition, ester plasticizers can also be used.

Typical ester plasticizers are chosen from the group consisting of phthalates, phosphates, adipates, azelates, oleates, and sebacates. Specific examples are the dialkyl phthalates such as di(2-ethylhexyl)phthalate, dibutyl phthalate, diethyl phthalate, dioctyl phthalate, butyl octyl phthalate, dicyclohexyl phthalate, butyl benzyl phthalate; diaryl phosphates such as tricresyl phosphate, triphenyl phosphate, cresyl diphenyl phosphate; trialkyl phosphates, such as trioctyl phosphate and tributyl phosphate; alkoxyalkyl phosphates such as tributoxyethyl phosphate; alkylaryl phosphates such as octylphenyl phosphate; alkyl adipate such as di(2-ethylhexyl)adipate, diisooctyl adipate, octyldecyl adipate; dialkyl sebacates such as dibutyl sebacate, dioctyl sebacate, diisooctyl sebacate; alkyl azelates such as di-2-ethylhexyl azelate and di(2-ethylbutyl)azelate and the like. Analogous esters can be made from citric and salicylic acids. Esters of monocarboxylic acids such as benzoic acid with, for example, diethylene glycol, dipropylene glycol, triethylene glycol, and the like are also useful as are toluene sulfonamides.

Mixtures of two or more of the above-described dispersing media are also useful and often cheaper and more efficient.

From the standpoint of availability, cost and performance, liquid hydrocarbons and particularly liquid petroleum fractions represent particularly useful dispersing media. Included within these classes are benzene and alkylated benzenes, naphthalene-based petroleum fractions, paraffin-based petroleum fractions, petroleum ethers, petroleum naphthas, mineral oil, Stoddard Solvent, and mixtures thereof. Typically the dispersing medium is mineral oil or at least about 25% of the total medium is mineral oil. Often at least about 50% of the dispersing medium is mineral oil. As noted, mineral oil can serve as the exclusive dispersing medium or it can be combined with some nonmineral oil organic liquid such as, for example, esters, ketones, etc.

In addition, it is sometimes desirable to incorporate into the afore-described non-Newtonian colloidal disperse system one or more waxes as described in U.S. Pat. No. 3,746,643 and U.K. Pat. No. 1,239,860, both of which are expressly incorporated herein by reference for their description of suitable waxes and procedures for incorporating them into non-Newtonian colloidal disperse systems. The waxes may be natural, synthetic, amorphous, crystalline, non-crystalline, or a mixture of two or more of any of these. The amount of waxes, if any, incorporated in the disperse system will normally be within the ranges described in said patents.

In addition to the solid metal-containing particles and the dispersing medium, the afore-described non-Newtonian colloidal disperse systems include at least one organic compound which is soluble in the dispersing medium and whose molecules are characterized by the presence of a hydrophobic portion and at least one polar substituent. While the types of suitable organic compounds are extremely diverse and include generally oil-soluble organic acids such as phosphorus acids, thiophosphorus acids, sulfur acids, carboxylic acids, thiocarboxylic acids and the like, as well as their corresponding alkali and alkaline earth salts, the alkaline earth and alkali metal salts of oil-soluble petrosulfonic acids, mono-, di- and tri-aliphatic hydrocarbon sulfonic acids and oil-soluble fatty acids, are, for reasons of economy, availability and performance particularly suitable. While the practice and description of the invention does not depend on any particular theory, it is believed that at least a portion of the organic compounds orient themselves along the external surface of the colloidal particles and thereby form micellar colloidal particles characterized by at least one metal-containing layer, at least one hydrophobic layer, and a polar layer bridging said metal-containing layer and said hydrophobic layer.

Broadly speaking, the non-Newtonian colloidal disperse systems used in the drilling fluids of the present invention are prepared by treating a single phase homogeneous Newtonian system of an overbased organic compound corresponding to one or more of the organic compounds described hereinabove with a conversion agent which is usually an active hydrogen-containing compound.

Typical active hydrogen-containing conversion agents include lower aliphatic carboxylic acids, water, aliphatic alcohols, alicyclic alcohols, phenols, ketones, aldehydes, amines, boron acids, and phosphorus acids. Oxygen, air and carbon dioxide can also be used as conversion agents. Often a mixture of water and alcohols (e.g., a lower alkanol) is used. Such mixtures usually have weight ratios of alcohol to water of from about 0.05:1 to about 24:1. Water and carbon dioxide mixtures are also very useful conversion agents.

The treating operation is simply a thorough mixing together of the two components, i.e., homogenization. This homogenization is generally achieved by vigorous agitation of the components at or near the reflux temperature of the mixture. Usually this temperature ranges from about 25 to about 200° C., typically it is no more than about 150° C. This treatment converts these single phase systems into non-Newtonian colloidal disperse systems. Suitable overbased materials are well known to the art and are disclosed in a large number of U.S. patents. Representative examples of these patents are disclosed in column 8 of the afore-mentioned U.S. Pat. No. 3,384,586 patent and this disclosure is hereby incorporated by reference. Further details as to the preparation of the non-Newtonian colloidal disperse systems are found in the above-noted U.S. Pat. Nos. 3,384,586, 3,242,079, 3,027,325, 3,488,284, 3,372,114, 3,411,923, 3,372,115, 3,422,013, 3,350,308, 3,312,618, 3,376,222, 3,471,403, 3,453,124, 3,377,283, 3,595,790, 3,766,067, 3,766,066, 3,671,012 and 3,492,231 which are hereby incorporated by reference for their disclosures relating to the preparation on non-Newtonian colloidal disperse systems.

THE EMULSIFIERS

The second component of the additives of this invention is (B) at least one emulsifier. These emulsifiers function primarily to emulsify the non-colloidal disperse system in drilling fluid or mud so that it does not substantially separate during periods of storage or low agitation. They thus also serve to stabilize the emulsions formed.

Many such emulsifiers are known to the art. See, for example, the discussion in Kirk-Othmer, "Encyclopedia of Chemical Technology", Volume 8, pages 127-134.

The emulsifiers used in the present invention can be ionic or non-ionic; typically they are non-ionic or cationic emulsifiers.

Among the useful emulsifiers are alkylene oxide condensates (i.e., alkoxylates) with active hydrogen compounds such as alcohols, phenols, amides and amines. The amides are often fatty acid amides such as oleyl amides. A particularly useful class of emulsifiers are the ethoxylated amines wherein the amine has at least 12 carbon atoms. Such cationic emulsifiers can be represented by the general formulae:

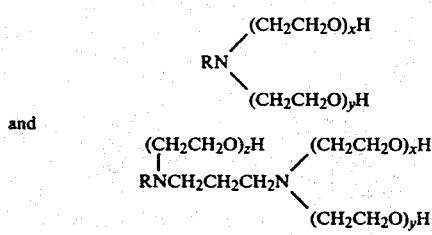

and wherein R is an aliphatic hydrocarbyl group with at least about 12 carbon atoms, x, y and z are integers of zero to 40 and the sum x+y is between two and 50. Usually the aliphatic group R has a maximum of about 22 carbons. Often such R groups are fatty alkyl or alkenyl groups such as coco ($C_{12}$), stearyl ($C_{18}$), tallow ($C_{18}$), oleyl ($C_{18}$), and the like. Typically R is a tallow residue and the sum x+y is about five. Homologous alkoxylated amines wherein the ethoxyl residue ($-CH_2CH_2O-$) is replaced, at least in part, by a propoxyl residue

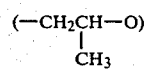

are also useful. Mixtures of one or more of the aforedescribed emulsifiers can be used.

A number of useful emulsifiers of the alkoxylated type are sold by the Armak Company under the tradename Etho-Chemicals. These include Ethofats, Ethomeens, Ethoduomeens, Ethomids and Ethoquads.

The additives used in the drilling fluids of the present invention generally comprise about 10 to about 95 percent of (A) at least one non-Newtonian colloidal disperse system and (B) about five to about 90 percent of at least one emulsifier. Typically, they comprise about 70 to about 90 percent non-Newtonian colloidal disperse system (A) and about 30 to about 10 percent emulsifier (B).

These additives are present in drilling fluids and drilling muds of the present invention in concentrations ranging from about one-half percent to about 10 percent of the drilling mud. They may be added directly to the drilling mud or they may be first diluted with water or a substantially inert solvent/diluent such as the dispersing media described above. Mixtures of water and dispersing media or of dispersing media can be used.

Often it is found that the addition of the emulsifier (B) to the colloidal disperse system (A) makes the whole additive system more easy to handle by reducing its viscosity.

The drilling fluids and muds of the present invention can contain other materials which are known to be used in such applications, such as clay thickeners, density-increasing agents such as barites, rust-inhibiting and corrosion-inhibiting agents, extreme pressure agents, supplementary surfactants and acid or basic reagents to adjust the pH of the system. A typical drilling fluid or mud of the present invention is made from a five percent bentonite clay slurry using well-known techniques.

The following are specific examples of the drilling fluid additives of the present invention. As is true throughout this specification and the appended claims, all percentages and parts are by weight unless otherwise specified and temperatures are in degrees Celcius.

EXAMPLE 1

A non-Newtonian colloidal disperse system is made according to the procedure described in U.S. Pat. No. 3,492,231 by gelling in the presence of a water/alcohol mixture a basic, carbonated calcium petrolsulfonate (approximate molecular weight of the free sulfonic acid is 430) having a metal ratio of 1200 and a 50% mineral oil content. The basic calcium petroleum sulfonate is made according to the procedure described in U.S. Pat. No. 3,350,308. The above-mentioned U.S. Pat. No. 3,350,308 and U.S. Pat. No. 3,492,231 are hereby expressly incorporated by reference for their disclosures relating to the preparation of the above-described compositions and their definition of metal ratio.

EXAMPLE 2

To 800 parts of the non-Newtonian colloidal disperse system described in Example 1 at about 90° is slowly added with stirring 200 parts of an ethoxylated tallow amine containing approximately five ethylene oxide-derived units. This ethoxylated tallow amine is sold by the Armak Corporation under the tradename Ethomeen T/15. The cooled additive mixture has a density of 9.15 lbs/gal.

EXAMPLE 3

Three parts of the additive described in Example 2 is slowly combined with a drilling mud made from a five percent bentonite slurry using moderate stirring. The viscosity of the mud increases significantly as the additve is dispersed in it. A rust inhibitor is added. The resultant slurry exhibits a Timken value of 30 pounds. A five percent bentonite slurry lacking the additive fails at a Timken value of less than five pounds.

EXAMPLE 4A and B

Two more additive mixtures are made in essentially the same fashion as described in Example 2 using the disperse system of Example 1 and an ethoxylated coco amine (4A) and a mixture of equal parts of ethoxylated coco amine and ethoxylated stearyl amine (4B). In each case, 80 parts of the disperse system and 20 parts of the emulsifier are used.

What is claimed is:

1. An aqueous well-drilling fluid comprising (A) at least one non-Newtonian colloidal disperse system comprising:
   (1) solid metal-containing colloidal particles having a unit particle size of from about 20 A to about 5,000 A consisting essentially of alkaline earth metal salts, said salts being characterized by having been formed in situ, at least a portion of which are pre-dispersed in
   (2) at least one organic liquid dispersing medium; and
   (3) as an essential component, at least one organic compound which is soluble in said dispersing medium, the molecules of said organic compound being characterized by a hydrophobic portion and at least one polar substituent and (B) a clay/water slurry and (C) at least one emulsifier effective for emulsifying said disperse system in said clay/water slurry.

2. A fluid as claimed in claim 1 wherein said non-Newtonian colloidal disperse system comprises:
   (1) said solid metal-containing colloidal particles,
   (2) a dispersing medium consisting essentially of mineral oil and
   (3) as an essential component, at least one organic compound which is soluble in said mineral oil selected from the group consisting of alkali and alkaline earth metal salts of oil-soluble petrosulfonic acids, mono-, di- and tri-aliphatic hydrocarbyl sulfonic acids and oil-soluble fatty acids, where in said non-Newtonian system at least a portion of the molecules of said organic compounds is oriented along the external surface of the colloidal particles thereby forming micellar colloidal particles characterized by at least one metal-containing layer and at least one hydrophobic layer and a polar layer bridging said metal-containing layer and said hydrophobic layer.

3. A fluid as claimed in claim 2 wherein said emulsifier (C) is an alkylene oxide/hydrocarbyl amine condensate wherein the amine has at least about 12 carbon atoms.

4. A fluid as claimed in claim 3 wherein said solid metal-containing colloidal particles consist essentially of calcium and/or barium salts.

5. A fluid as claimed in claim 4 wherein said emulsifier (C) is represented by the general formula

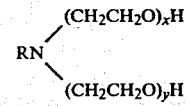

wherein R is an aliphatic hydrocarbyl group with up to about 22 carbon atoms, x and y are both integers of one to ten and the sum x+y averages between about two and about 50.

6. A fluid as claimed in claim 5 wherein R is a tallow residue and the sum x+y averages between about three and about ten.

7. A fluid as claimed in claim 2 wherein said solid metal-containing particles are further characterized by having a unit particle size of from about 20 A to about 1000 A.

8. A fluid as claimed in claim 7 wherein said salts are selected from the group consisting of calcium and barium carbonates and acetates and mixtures of two or more of any of them.

9. A fluid as claimed in claim 6 wherein said salts are selected from the group consisting of calcium and barium carbonates and acetates and mixtures of two or more of any of them.

10. A fluid as claimed in claim 1 wherein the amount of non-Newtonian disperse system comprises about 10 to about 95 weight percent of the additive.

11. A fluid as claimed in claim 10 wherein said emulsifier (B) comprises about five to about 90 weight percent of the additive.

12. A fluid as claimed in claim 1 wherein said clay comprises bentonite.

13. A fluid as claimed in claim 6 wherein said clay comprises bentonite.

14. A fluid as claimed in claim 8 wherein said clay comprises bentonite.

15. A method of reducing torque requirements in rotary well drilling operations which comprises circulating in said well while drilling the drilling fluid of claim 1.

16. A method of reducing torque requirements in rotary well drilling operations which comprises circulating in said well while drilling the drilling fluid of claim 6.

17. A method of reducing torque requirements in rotary well drilling operations which comprises circulating in said well while drilling the drilling fluid of claim 8.

18. A method of reducing torque requirements in rotary well drilling operations which comprises circulating in said well while drilling the drilling fluid of claim 12.

19. A method of reducing torque requirements in rotary well drilling operations which comprises circulating in said well while drilling the drilling fluid of claim 14.